United States Patent
Moon et al.

(10) Patent No.: US 10,656,650 B2
(45) Date of Patent: May 19, 2020

(54) METHOD FOR GUIDING AND CONTROLLING DRONE USING INFORMATION FOR CONTROLLING CAMERA OF DRONE

(71) Applicant: KOREAN AIR LINES CO., LTD., Seoul (KR)

(72) Inventors: Jung Ho Moon, Daejeon (KR); Da Hyoung Jeon, Daejeon (KR); Youn Han Choi, Daejeon (KR)

(73) Assignee: KOREAN AIR LINES CO., LTD., Seoul (KR)

( * ) Notice: Subject to any disclaimer, the term of this patent is extended or adjusted under 35 U.S.C. 154(b) by 124 days.

(21) Appl. No.: 15/542,417

(22) PCT Filed: Jan. 11, 2016

(86) PCT No.: PCT/KR2016/000217
§ 371 (c)(1),
(2) Date: Sep. 20, 2017

(87) PCT Pub. No.: WO2016/111595
PCT Pub. Date: Jul. 14, 2016

(65) Prior Publication Data
US 2018/0032077 A1 Feb. 1, 2018

(30) Foreign Application Priority Data

Jan. 9, 2015 (KR) .................. 10-2015-0003354

(51) Int. Cl.
*G05D 1/00* (2006.01)
*B64D 47/08* (2006.01)
(Continued)

(52) U.S. Cl.
CPC ........... *G05D 1/0094* (2013.01); *B64C 39/02* (2013.01); *B64C 39/024* (2013.01); *B64D 47/08* (2013.01);
(Continued)

(58) Field of Classification Search
CPC . B64C 39/02; B64C 39/024; B64C 2201/141; B64D 47/08; H04N 5/23296; G05D 1/0094; G05D 1/12
(Continued)

(56) References Cited

U.S. PATENT DOCUMENTS 5,566,087 A * 10/1996 Voigt ..................... H04N 5/232
345/163
7,343,232 B2 * 3/2008 Duggan ............... G05D 1/0061
244/75.1
(Continued)

FOREIGN PATENT DOCUMENTS

JP 2006027448 A * 2/2006
JP 2006-264573 A 10/2006
(Continued)

*Primary Examiner* — Atul Trivedi
(74) *Attorney, Agent, or Firm* — Rabin & Berdo, P.C.

(57) ABSTRACT

The present invention relates to a method of guiding and controlling an unmanned aerial system based on camera control information of the unmanned aerial system, the method comprising the steps of: (a) controlling a vertical axis of the unmanned aerial system by controlling a zoom of a gimbal camera 330 by a zoom controller 120 of a camera control unit 100 so as to control an elevation and speed of the unmanned aerial system 300 with a corresponding camera control signal; and (b) controlling a horizontal axis of the unmanned aerial system by controlling an angle of the gimbal camera 330 by an angle controller 110 of the camera control unit 100. Accordingly, the present invention is applicable by just modifying software without changing a general system of an unmanned aerial system, has an advan-
(Continued)

tage that a camera controller is enough to control a mission flight of the unmanned aerial system, and is improved in convenience and tracking performance since the speed, elevation, flight path, etc. of the unmanned aerial system are automatically controlled when a camera is used to continuously track a specific target.

8 Claims, 7 Drawing Sheets

(51) Int. Cl.
 *B64C 39/02* (2006.01)
 *G05D 1/12* (2006.01)
 *H04N 5/232* (2006.01)
(52) U.S. Cl.
 CPC ........... *G05D 1/12* (2013.01); *H04N 5/23296* (2013.01); *B64C 2201/141* (2013.01)
(58) Field of Classification Search
 USPC .......................................................... 701/4
 See application file for complete search history.

(56) References Cited

U.S. PATENT DOCUMENTS

| | | | | |
|---|---|---|---|---|
| 8,581,981 | B2* | 11/2013 | Alley | H04N 7/185 348/144 |
| 9,862,489 | B1* | 1/2018 | Weinstein | B64C 39/024 |
| 10,266,263 | B2* | 4/2019 | Zhang | B64C 39/024 |
| 2013/0048792 | A1* | 2/2013 | Szarek | B64C 39/024 244/175 |
| 2013/0050487 | A1* | 2/2013 | Omer | B64D 47/08 348/144 |
| 2013/0192451 | A1* | 8/2013 | Scott | F41G 3/00 89/41.05 |
| 2014/0013361 | A1* | 1/2014 | Monari | H04N 5/2252 725/62 |
| 2014/0032021 | A1* | 1/2014 | Metzler | G01S 5/0036 701/3 |
| 2014/0263823 | A1* | 9/2014 | Wang | B64C 39/028 244/17.23 |
| 2014/0270743 | A1* | 9/2014 | Webb | H04N 5/2328 396/55 |
| 2014/0334668 | A1* | 11/2014 | Saund | G06T 7/20 382/103 |
| 2014/0336848 | A1* | 11/2014 | Saund | G08G 1/054 701/3 |
| 2016/0117853 | A1* | 4/2016 | Zhong | B64C 39/024 345/634 |
| 2017/0010611 | A1* | 1/2017 | Tao | G06F 3/147 |
| 2018/0002010 | A1* | 1/2018 | Bauer | B64C 29/0025 |
| 2018/0149138 | A1* | 5/2018 | Thiercelin | F03D 17/00 |
| 2018/0158197 | A1* | 6/2018 | Dasgupta | G05D 1/0094 |
| 2018/0246529 | A1* | 8/2018 | Hu | G05D 1/0202 |
| 2019/0011921 | A1* | 1/2019 | Wang | G06K 9/00664 |
| 2019/0064794 | A1* | 2/2019 | Chen | G05D 1/0016 |
| 2019/0075252 | A1* | 3/2019 | Zhao | G01C 21/00 |
| 2019/0250601 | A1* | 8/2019 | Donahoe | B64C 39/024 |

FOREIGN PATENT DOCUMENTS

| | | |
|---|---|---|
| JP | 2012-168305 A | 9/2012 |
| KR | 10-2010-0053220 A | 5/2010 |
| KR | 10-1083128 B1 | 11/2011 |
| KR | 10-2012-0015584 A | 2/2012 |

* cited by examiner (a)

(b)

METHOD FOR GUIDING AND CONTROLLING DRONE USING INFORMATION FOR CONTROLLING CAMERA OF DRONE

TECHNICAL FIELD

The present invention relates a method of guiding and controlling an unmanned aerial system based on camera control information of the unmanned aerial system, and more particularly to a method of guiding and controlling an unmanned aerial system based on camera control information of the unmanned aerial system, in which a camera controller is enough to control a mission flight of the unmanned aerial system, and the speed, elevation, flight path, etc. of the unmanned aerial system are automatically controlled when a camera is used to continuously track a specific target.

BACKGROUND ART

For a mission flight of a conventional unmanned aerial system, there are needed a sensor pilot who pilots a mounted camera and an internal pilot who pilots a flight of the unmanned aerial system.

Therefore, an aerial system control command (an airline point, an elevation command, a speed command) is issued by the internal pilot, and a joystick command needed for camera driving and reconnaissance is issued by the sensor pilot. Such issued commands are transmitted to a mounted flight-control computer and the mounted camera through a wireless data link.

However, such a structure is inefficient to do a reconnaissance mission and deteriorates tracking performance if the camera is used to continuously track a specific target.

DISCLOSURE

Technical Problem

Accordingly, the present invention is conceived to solve the foregoing problems, and an object of the present invention is to provide a method of guiding and controlling an unmanned aerial system based on camera control information of the unmanned aerial system, in which a camera controller is enough to control a mission flight of the unmanned aerial system, and the speed, elevation, flight path, etc. of the unmanned aerial system are automatically controlled when a camera is used to continuously track a specific target.

Technical Solution

In accordance with one aspect of the present invention, there is provided a method of guiding and controlling an unmanned aerial system based on camera control information of the unmanned aerial system, the method comprising the steps of: (a) controlling a vertical axis of the unmanned aerial system by controlling a zoom of a gimbal camera by a zoom controller of a camera control unit so as to control an elevation and speed of the unmanned aerial system with a corresponding camera control signal; and (b) controlling a horizontal axis of the unmanned aerial system by controlling an angle of the gimbal camera by an angle controller of the camera control unit.

The method of guiding and controlling an unmanned aerial system based on camera control information of the unmanned aerial system further includes: (a-1) by the zoom controller 120 of the camera control unit 100, generating a zoom command signal to control the zoom of the gimbal camera 330 the zoom command signal; (a-2) by a flight control computer 310 of the unmanned aerial system 300, comparing the zoom included in the command signal with an optical zoom; (a-3) by the flight control computer 310 of the unmanned aerial system 300, comparing the zoom included in command signal with a digital zoom; (a-4) by the flight control computer 310, calculating an elevation command signal by multiplying the zoom by a scale value and at the same time calculating a speed command signal if the zoom is greater than the digital zoom; and (a-5) by the flight control computer 310, comparing an elevation included in the elevation command signal with an elevation limitation value, issuing a command of lowering the elevation if the elevation is greater than the elevation limitation value, and maintaining the current elevation command If the elevation is not greater than the elevation limitation value.

The method of guiding and controlling an unmanned aerial system based on camera control information of the unmanned aerial system further includes: (b-1) transmitting a camera control signal generated by an angle controller 110 of the camera control unit 100 to the unmanned aerial system 300 through wireless communication; (b-2) controlling the gimbal camera 330 by delivering the camera control signal received in the flight control computer 310 to the gimbal camera 330; (b-3) by the flight control computer 310, calculating a center point (a target point), at which the center of the gimbal camera 300 looks, based on angle information of the gimbal camera 330 and a flight posture and location data measured by a navigation equipment 350 mounted to the unmanned aerial system 300; (b-4) by the flight control computer 310, calculating an offset between the target and the center point; and (b-5) by the flight control computer 310, inputting a new airway point based on the calculated offset to guiding and controlling logic so that the unmanned aerial system can continuously track a virtual airway point.

Advantageous Effects

The present invention is applicable by just modifying software without changing a general system of an unmanned aerial system, has an advantage that a camera controller is enough to control a mission flight of the unmanned aerial system, and is improved in convenience and tracking performance since the speed, elevation, flight path, etc. of the unmanned aerial system are automatically controlled when a camera is used to continuously track a specific target.

BEST MODE

Figure 1:
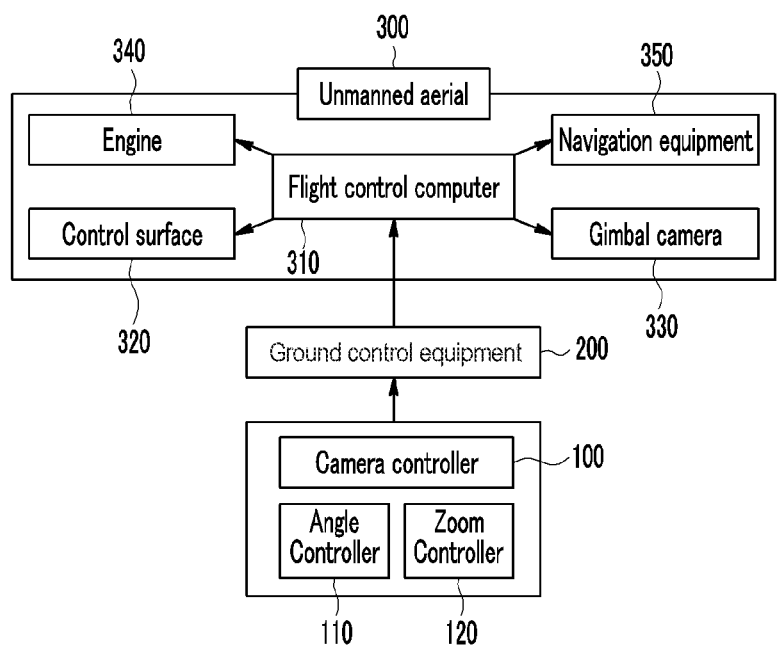
FIG. 1 is a block diagram of a system for guiding and controlling an unmanned aerial system based on camera control information of the unmanned aerial system according to the present invention.

Below, embodiments of the present invention will be described in detail with reference to accompanying drawings. In the following description, terms or words used in the specification and claims are construed as not typical or lexical meaning but meaning and concept corresponding to the idea of the present invention on the principle that the inventor can properly define the concept of the terms in order to explain his/her own invention for the best.

Therefore, it has to be understood that various equivalents and alternatives can be made at the time of filing the present invention since the descriptions of the specification and the features shown in the drawings are no other than preferred embodiments without reflecting all the technical ideas of the present invention.

FIG. 1 is a block diagram of a system for guiding and controlling an unmanned aerial system based on camera control information of the unmanned aerial system according to the present invention, As shown in FIG. 1, a system for guiding and controlling an unmanned aerial system based on camera control information of the unmanned aerial system according to the present invention includes a camera control unit 100 having an angle controller 110 and a zoom controller 120; ground control equipment 200; and an unmanned aerial system 300 having a flight control computer 310, a control surface 320, a gimbal camera 330, an engine 340, and navigation equipment 350.

Figure 2:
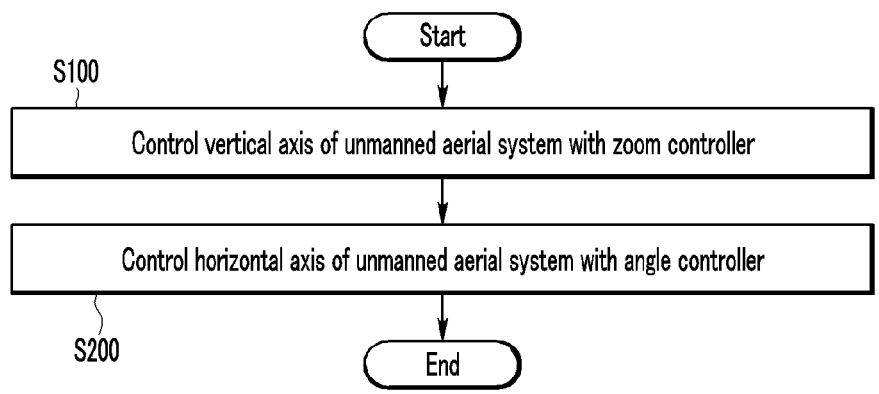
FIG. 2 is a flowchart of guiding and controlling an unmanned aerial system based on camera control information of the unmanned aerial system according to the present invention.

With the foregoing elements, as shown in FIG. 2, a control method based on the system for guiding and controlling an unmanned aerial system based on camera control information of the unmanned aerial system according to the present invention includes the steps of controlling a longitudinal axis of the unmanned aerial system by controlling a zoom of the gimbal camera 330 by the zoom controller 120 of the camera control unit 100 so as to control the altitude and speed of the unmanned aerial system (S100); and controlling a lateral-directional axis of the unmanned aerial system by controlling an angle of the gimbal camera 330 by the angle controller 110 of the camera control unit 100 (S200).

Figure 3:
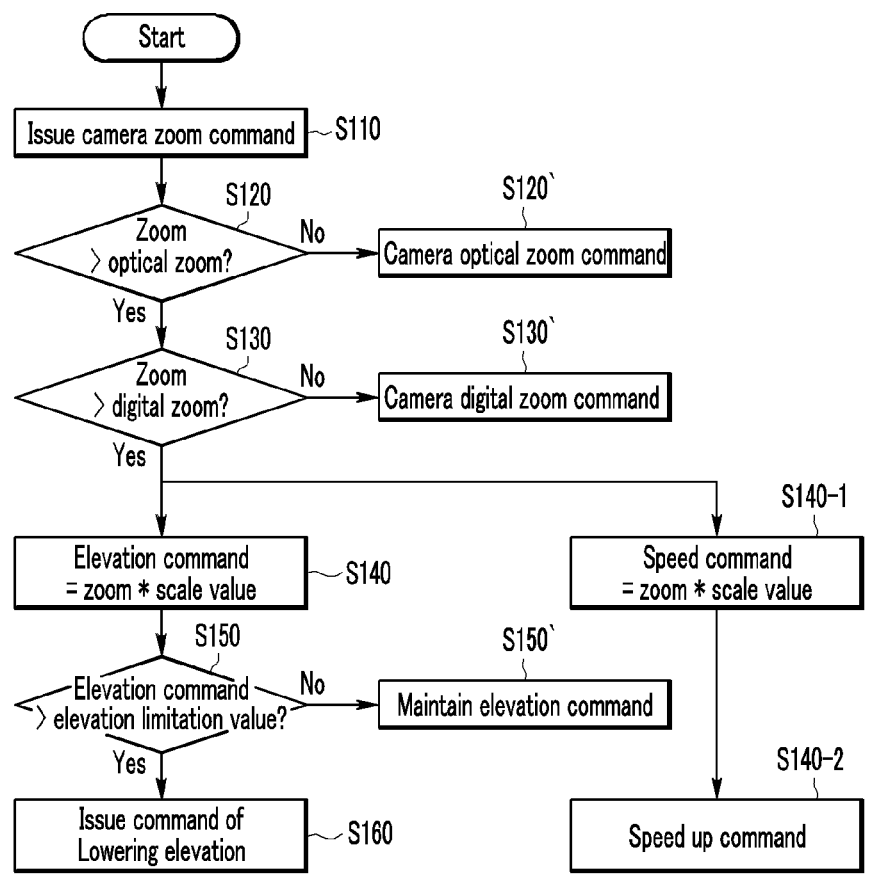
FIG. 3 is a flowchart of controlling a longitudinal axis in the method of guiding and controlling an unmanned aerial system based on camera control information of the unmanned aerial system according to the present invention.

In the foregoing system of guiding and controlling the unmanned aerial system based on the camera control information of the unmanned aerial system according to the present invention, the step S100 of controlling the longitudinal axis of the unmanned aerial system will be described in detail with reference to FIG. 3.

A zoom command signal is generated to control the zoom of the gimbal camera 330 through the zoom controller 120 of the camera control unit 100 (S110).

The flight control computer 310 determines whether the zoom included in command signal is greater than an optical zoom (S120), determines whether the zoom is greater than a digital zoom (S130) if it is determined in the step S120 that the zoom is greater than the optical zoom, calculates an altitude command signal by multiplying the zoom by a scale value (S140) and at the same time calculates a speed command signal (S140-1) if it is determined in the step S130 that the zoom is greater than the digital zoom.

The flight control computer 310 issues a command of the optical zoom (S120') if it is determined in the step S120 that the zoom is not greater than the optical zoom S120.

Likewise, the flight control computer 310 issues a command of the digital zoom (S130') if it is determined in the step S130 that the zoom is not greater than the digital zoom S130.

After the step S140, the flight control computer 310 determines whether an elevation included in the altitude command signal is greater than an altitude limitation value (S150), and issues a command of lowering the altitude (S160) if the altitude is greater than the altitude limitation value.

If it is determined in the step S150 that the altitude is not greater than the altitude limitation value, the flight control computer 310 maintains the current altitude command (S150').

After the step S140-1, the flight control computer 310 issues a speed-up command or a speed-down command based on comparison with the speed limitation value (S140-2).

In the foregoing system of guiding and controlling the unmanned aerial system based on the camera control information of the unmanned aerial system according to the present invention, the step S200 of controlling the lateral-directional axis of the unmanned aerial system will be described in detail with reference to FIG. 4.

Figure 4:
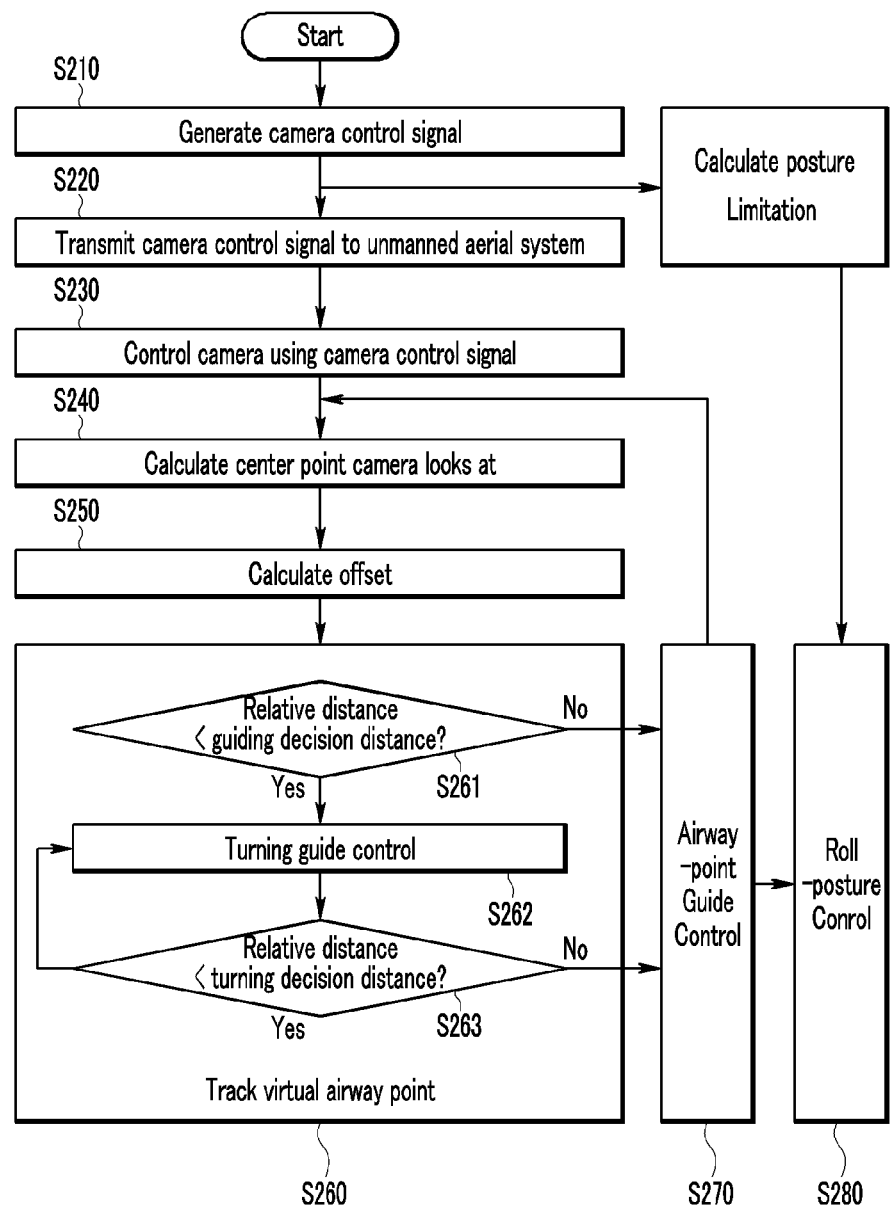
FIG. 4 is a flowchart of controlling a lateral-directional axis in the method of guiding and controlling an unmanned aerial system based on camera control information of the unmanned aerial system according to the present invention.

For reference, FIG. 4 is a flowchart of controlling a lateral-directional axis in the method of guiding and controlling an unmanned aerial system based on camera control information of the unmanned aerial system according to the present invention.

As shown in FIG. 4, a camera control signal for controlling the lateral-directional axis of the unmanned aerial system and a camera control signal for controlling the longitudinal axis of the unmanned aerial system are generated through the angle controller 110 and the zoom controller 120 of the camera control unit 100 (S210).

The camera control signals generated by the camera control unit 100 are transmitted to the unmanned aerial system 300 by the ground control equipment 200 through wireless communication (S220).

The flight control computer 310 of the unmanned aerial system 300 receives the camera control signals and delivers them to the gimbal camera 330, thereby controlling the gimbal camera 330 (S230).

At this time, if the gimbal camera 330 is changed in a field of view (FOV) in accordance with the zoom of the gimbal camera 330, the flight control computer 310 reflects such a changed value on an aerial system posture limitation value, and thus limits an autopilot posture so that the target can come into the FOV without getting out of a view angle when the aerial system operates.

Figure 6:
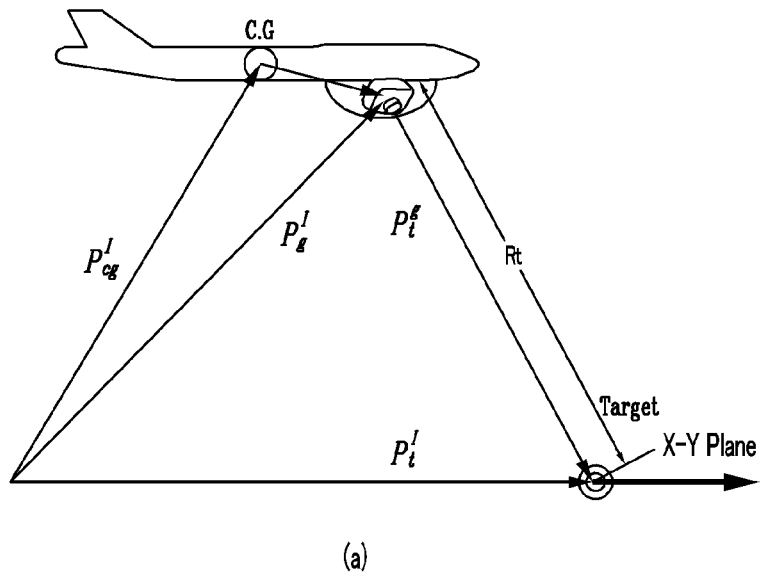
FIG. 6 is a geometrical relationship between an aerial system and a target.
Figure 6:
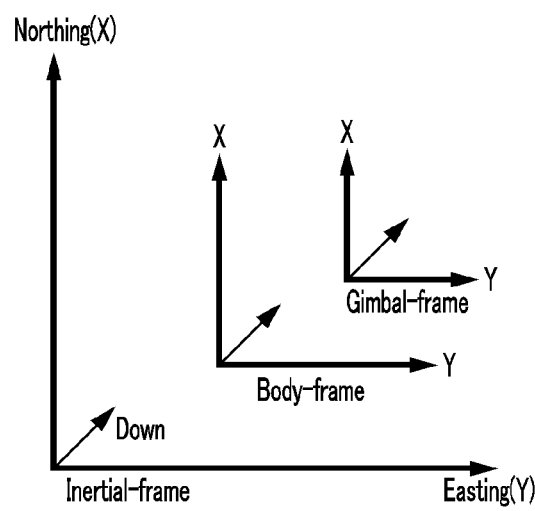
Figure 7:
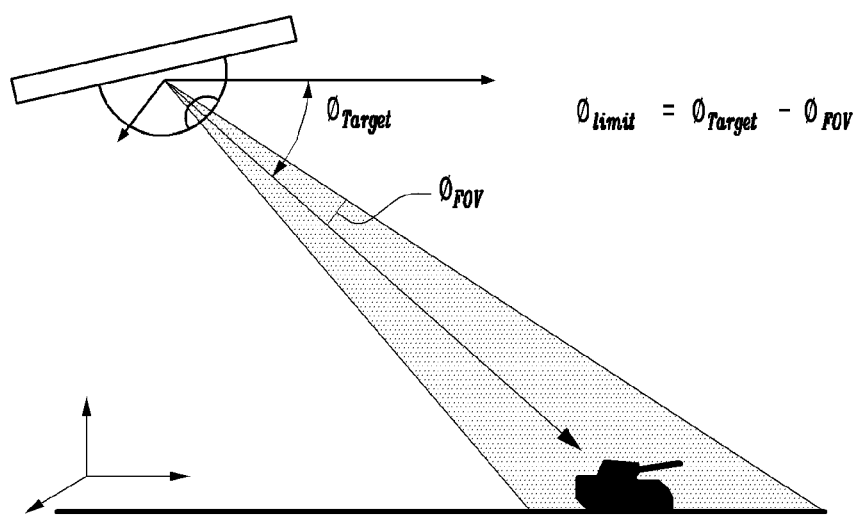
FIG. 7 is a view for explaining an equation for a posture limitation value.

In other words, as shown in FIG. 6, the flight control computer 310 calculates the posture limitation value ($\varphi$limit) of the aerial system by subtracting the angle of camera FOV ($\varphi$FOV) from the angle ($\varphi$Target) between the gimbal camera 330 and the target.

The flight control computer 310 calculates the center point (i.e. the target point), at which the center of the gimbal camera 330 targets, based on the camera gimbal angle information output from the gimbal camera 330 and a flight altitude and location data measured by the navigation equipment 350 mounted to the unmanned aerial system 300 as the unmanned aerial system 300 flies, under control of the gimbal camera 330 (S240).

In the step S240 the center point or the target point is calculated as follows.

$$p_t^I = \vec{P}_{cg}^I + (\vec{P}_g^{cg} + \vec{P}_t^g) = P_{cg}^I + C_b^n C_g^b R_g \quad \text{[Equation 1]}$$

where, $$\vec{R}_g = [R_t 0 0]^T$$

is a gimbal vector, $R_t$ is a distance from the center of the gimbal to the target point, $P_{cg}^I = [X_{cg}^I Y_{cg}^I Z_{cg}^I]^T$ is a position of center of gravity in the unmanned aerial system, and $P_g^{cg} = [X_g^{cg} Y_g^{cg} Z_g^{cg}]^T$ is a position of the gimbal from the center of gravity of the unmanned aerial system.

[Equation 1] will be described in more detail with reference to FIG. 6 showing a geometrical relationship between an aerial system and a target.

Based on the geometrical relationship, a position ($P_t^I$) of the target in an inertial coordinate system is equal to the sum from the position vector ($\vec{P}_{cg}^I$) at the center of gravity of the aerial system to the position vector ($\vec{P}_t^g$) of the gimbal.

Among them, in case of the vector from the center of gravity of the aerial system to the target, the vector from the gimbal to the target may be converted into reference coordinates for the center of gravity of the aerial system and then converted into geocentric coordinates, based on a relative distance vector.

For reference, there are three coordinates as shown in (b) of FIG. 6, where the first is an inertial coordinate system (Inertial Frame) with respect to the center of the earth, the second is a body coordinate system (Body Frame) with respect to the center of gravity of the unmanned aerial system, and the third is a gimbal coordinate system (Gimbal Frame) with respect to the mission equipment.

At this time, a relational expression for conversion from the center of gravity to the geocentric coordinates is represented in the following [Equation 2], where the capitals 'S' and 'C' respectively indicate Sine and Cosine.

That is, $C_\theta$ is $\cos(\theta)$, and $S_\psi$ is $\sin(\psi)$.

$$C_b^n = \begin{bmatrix} C_\theta C_\psi & S_\phi S_\theta C_\psi - C_\phi S_\psi & C_\phi S_\theta C_\psi + S_\phi S_\psi & 0 \\ C_\theta S_\psi & S_\phi S_\theta S_\psi + C_\phi C_\psi & C_\phi S_\theta S_\psi - S_\phi C_\psi & 0 \\ -S_\theta & S_\phi C_\theta & C_\phi C_\theta & 0 \\ 0 & 0 & 0 & 1 \end{bmatrix} \quad \text{[Equation 2]}$$

where, θ is a pitch posture (angle), φ is a roll posture (angle), and ψ is a heading (angle).

Similarly, an expression for conversion from the gimbal to the center of gravity is represented in the following [Equation 3].

$$C_g^b = \begin{bmatrix} C_\theta C_\psi & -S_\psi & S_\theta C_\psi & x_g^{cg} \\ C_\theta S_\psi & C_\psi & S_\theta S_\psi & y_g^{cg} \\ -S_\theta & 0 & C_\theta & z_g^{cg} \\ 0 & 0 & 0 & 1 \end{bmatrix} \quad \text{[Equation 3]}$$

The most important information is a distance ($R_t$) between the gimbal camera 330 and the target. By developing the foregoing vector expression, this distance ($R_t$) is calculated as follows.

[Equation 1] is developed by substations of [Equation 2] and [Equation 3] as follows.

$$p_t^I = \begin{bmatrix} X_t \\ Y_t \\ Z_t \\ 1 \end{bmatrix} = \begin{bmatrix} X_{cg}^I \\ Y_{cg}^I \\ Z_{cg}^I \\ 1 \end{bmatrix} + \quad \text{[Equation 4]}$$

$$\begin{bmatrix} C_\theta C_\psi & S_\phi S_\theta C_\psi - C_\phi S_\psi & C_\phi S_\theta C_\psi + S_\phi S_\psi & 0 \\ C_\theta S_\psi & S_\phi S_\theta S_\psi + C_\phi C_\psi & C_\phi S_\theta S_\psi - S_\phi C_\psi & 0 \\ -S_\theta & S_\phi C_\theta & C_\phi C_\theta & 0 \\ 0 & 0 & 0 & 1 \end{bmatrix} \times$$

$$\begin{bmatrix} C_{\theta g} C_{\psi g} & -S_{\psi g} & S_{\theta g} C_{\psi g} & x_g^{cg} \\ C_{\theta g} S_{\psi g} & C_{\psi g} & S_{\theta g} S_{\psi g} & y_g^{cg} \\ -S_{\theta g} & 0 & C_{\theta g} & z_g^{cg} \\ 0 & 0 & 0 & 1 \end{bmatrix} \begin{bmatrix} R_t \\ 0 \\ 0 \\ 1 \end{bmatrix}$$

If $Z_t$ at the third row in [Equation 3] is 0, $R_t$ is obtained as follows.

$$Z_t = Z_{cg}^I + (-S_\theta C_{\theta g} C_{\psi g} + S_\phi C_\theta C_{\theta g} S_{\psi g} - C_\phi C_\theta S_{\theta g}) \times R_t +$$
$$(-S_\theta x_g^{cg} + S_\phi C_\theta y_g^{cg} + C_\phi C_\theta z_g^{cg}) = 0$$

$$R_t = \frac{Z_{cg}^I - (-S_\theta x_g^{cg} + S_\phi C_\theta y_g^{cg} + C_\phi C_\theta z_g^{cg})}{S_\theta C_{\theta g} C_{\psi g} - S_\phi C_\theta C_{\theta g} S_{\psi g} + C_\phi C_\theta S_{\theta g}}$$

Then, the position of the target is obtained by plugging $R_t$ in to [Equation 1].

Figure 5:
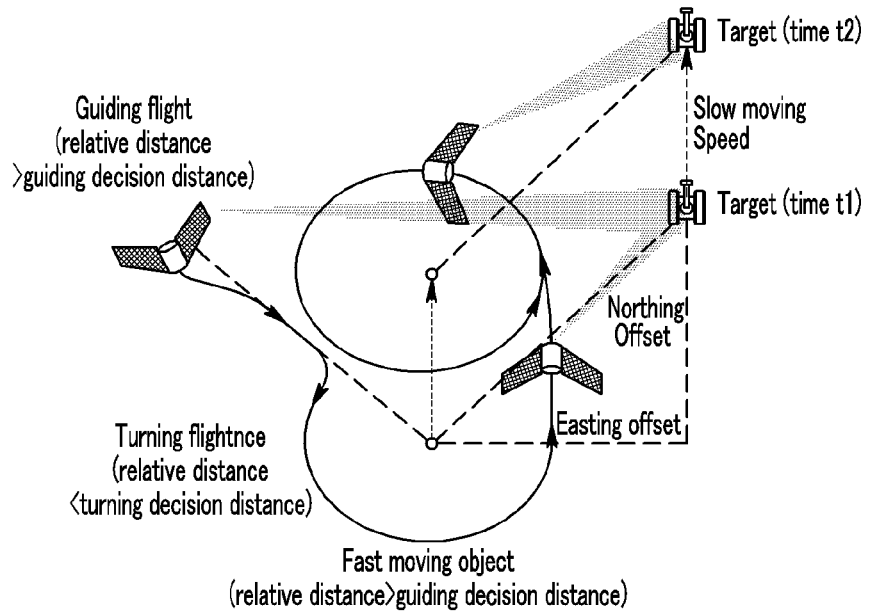
FIG. 5 illustrates an offset between a target and a center point.
Figure 5:
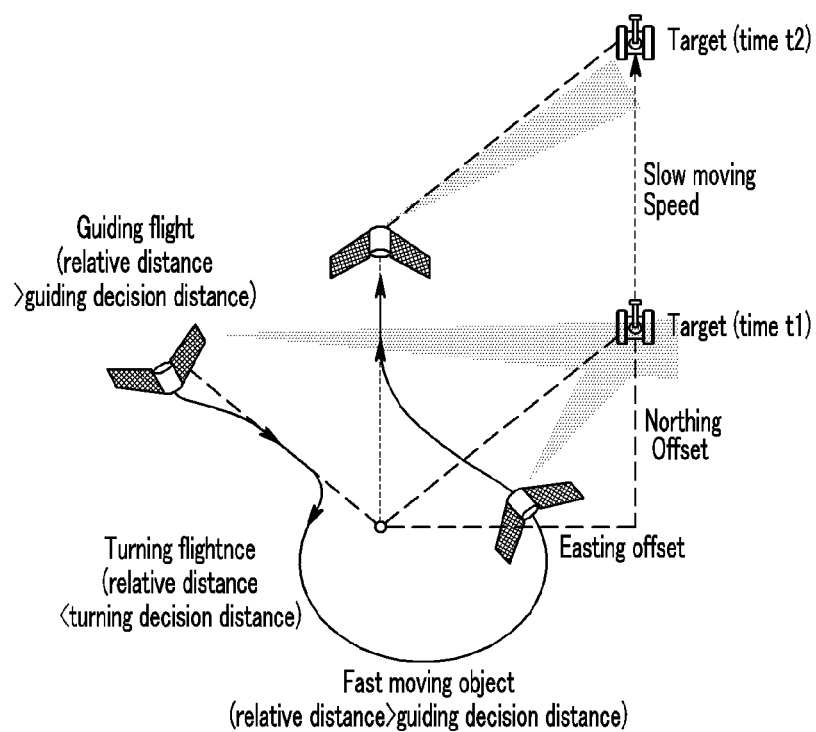

If the center point (or the target point) of the gimbal camera 330 is obtained in the step S240, the flight control computer 310 calculates an offset between the target and the center point as shown in FIG. 5 (S250).

Specifically, the flight control computer 310 calculates an easting offset and northing offset between the center point and the target.

Then, the flight control computer 310 inputs a new airway point to guiding and controlling logic in consideration of the offset calculated in the step S250, so that the unmanned aerial system 300 can continuously track a virtual airway point (S260).

In the step S260 of making the unmanned aerial system continuously track the virtual airway point, the flight control computer 310 performs the steps of comparing a relative distance between the unmanned aerial system 300 and the target with a guiding decision distance (S261), performing turning guide control if the guiding decision distance is longer than the relative distance (S262), comparing the relative distance and a turning decision distance (S263), and repetitively performing the turning guide control if the turning decision distance is longer than the relative distance (S262).

If the relative distance is longer than the guiding decision distance in the step S261 and the turning decision distance in the step S263, the flight control computer 310 repetitively performs the steps following the step S240 to thereby perform airway-point guide control (S270).

Although a few exemplary embodiments have been shown and described, it will be appreciated by those skilled in the art that changes may be made in these exemplary embodiments without departing from the principles and spirit of the invention, the scope of which is defined in the appended claims and their equivalents.

REFERENCE NUMERALS

100: camera control unit
110: angle controller
120: zoom controller
200: terrestrial control equipment
300: unmanned aerial system
310: flight control computer
320: control surface
330: gimbal camera
340: engine
350: navigation equipment

The invention claimed is:

1. A method of guiding and controlling an unmanned aerial system based on camera control information of the unmanned aerial system, in which a camera of a system for guiding and controlling the unmanned aerial system is used to continuously follow a specific target and automatically control an airspeed, an altitude and a flight path, the method comprising the steps of:
   (a) controlling a longitudinal axis of the unmanned aerial system by controlling a zoom of a gimbal camera by a zoom controller of a camera control unit so as to control an altitude and an airspeed of the unmanned aerial system with a corresponding camera control signal; and
   (b) controlling a lateral-directional axis of the unmanned aerial system by controlling an angle of the gimbal camera by an angle controller of the camera control unit, wherein
   the step of (a) comprises:
   (a-1) by the zoom controller of the camera control unit, generating a zoom command signal to control the zoom of the gimbal camera the zoom command signal;
   (a-2) by a flight control computer of the unmanned aerial vehicle, comparing the zoom included in the command signal with an optical zoom;
   (a-3) by the flight control computer of the unmanned aerial vehicle, comparing the zoom included in command signal with a digital zoom;
   (a-4) by the flight control computer, calculating an altitude command signal by multiplying the zoom by a scale value and at the same time calculating an airspeed command signal if the zoom is greater than the digital zoom; and
   (a-5) by the flight control computer, comparing an altitude included in the altitude command signal with an altitude limitation value, issuing a command of lowering the altitude if the altitude is greater than the altitude limitation value, and maintaining the current altitude command if the altitude is not greater than the altitude limitation value, wherein the step of (b) further comprises:
   (b-1) transmitting a camera control signal generated by an angle controller of the camera control unit to the unmanned aerial vehicle through wireless communication;
   (b-2) controlling the gimbal camera by delivering the camera control signal received in the flight control computer to the gimbal camera;
   (b-3) by the flight control computer, calculating a target point, at which the center of the gimbal camera targets, based on angle information of the gimbal camera and a flight altitude and location data measured by a navigation equipment mounted to the unmanned aerial vehicle;
   (b-4) by the flight control computer, calculating an offset between the target and the target point; and
   (b-5) by the flight control computer, inputting a new airway point based on the calculated offset to guiding and controlling logic so that the unmanned aerial vehicle can continuously follow a virtual airway point.

2. The method according to claim 1, further comprising:
by the flight control computer, issuing a command of the optical zoom if the zoom is not greater than the optical zoom.

3. The method according to claim 1, further comprising:
by the flight control computer, issuing a command of the digital zoom if the zoom is not greater than the digital zoom.

4. The method according to claim 1, wherein the step of (b-5) further comprises:
   (b-5-1) by the flight control computer, comparing a relative distance and a guiding decision distance between the unmanned aerial system and the target;
   (b-5-2) by the flight control computer, performing loitering guidance control if the guiding decision distance is longer than the relative distance; and
   (b-5-3) by the flight control computer, comparing the relative distance and a loitering decision distance.

5. The method according to claim 4, wherein the flight control computer repetitively performs the step (b-5-2) of performing the turning guide control if the turning decision distance is longer than the relative distance.

6. The method according to claim 4, the flight control computer repetitively performs the steps following the step (b-3) if the relative distance is longer than the guiding decision distance.

7. The method according to claim 1, wherein, in the step (b-3),
the flight control computer calculates the target point, at which the center of the gimbal camera targets, based on the following equation:

$$P_t^I = \vec{p}_{cg}^I + \left(\vec{p}_g^{cg} + \vec{p}_t^g\right) = P_{cg}^I + C_b^n C_g^b R_g$$

where, $$\vec{R}_g = [R_t 0 0]^T$$

is a gimbal vector,
$R_t$ is a distance from the center of the gimbal to the target point,
$P_{cg}^I = [X_{cg}^I Y_{cg}^I Z_{cg}^I]^T$ is a position of center of gravity of the unmanned aerial system, and $P_g^{cg} = [X_g^{cg} Y_g^{cg} Z_g^{cg}]^T$ is a position of the gimbal from the center of gravity of the unmanned aerial system.

8. The method according to claim 1, wherein, if the gimbal camera is changed in a field of view (FOV) in accordance with the zoom of the gimbal camera, the flight control computer reflects such a changed value on an aerial system posture limitation value.

\* \* \* \* \*